(12) United States Patent
Jayaraman et al.

(10) Patent No.: US 10,949,807 B2
(45) Date of Patent: *Mar. 16, 2021

(54) MODEL BUILDING ARCHITECTURE AND SMART ROUTING OF WORK ITEMS

(71) Applicant: ServiceNow, Inc., Santa Clara, CA (US)

(72) Inventors: Baskar Jayaraman, Fremont, CA (US); Debashish Chatterjee, Fremont, CA (US); Kannan Govindarajan, Sunnyvale, CA (US); Aniruddha Thakur, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 15/674,379

(22) Filed: Aug. 10, 2017

(65) Prior Publication Data

US 2018/0322462 A1 Nov. 8, 2018

Related U.S. Application Data

(60) Provisional application No. 62/501,646, filed on May 4, 2017, provisional application No. 62/501,657, filed (Continued)

(51) Int. Cl.
*G06N 20/00* (2019.01)
*G06Q 10/10* (2012.01)
(Continued)

(52) U.S. Cl.
CPC ......... *G06Q 10/103* (2013.01); *G06F 40/174* (2020.01); *G06N 5/04* (2013.01); *G06N 20/00* (2019.01); *H04L 67/10* (2013.01)

(58) Field of Classification Search
CPC ............ G06N 20/00; G06N 5/04; G06N 5/02; G06N 99/005; G06Q 10/103; G06F 40/174; G06F 17/243; H04L 67/10; H04L 29/08
(Continued)

(56) References Cited

U.S. PATENT DOCUMENTS 6,321,229 B1    11/2001   Goldman
6,609,122 B1     8/2003   Ensor
(Continued)

FOREIGN PATENT DOCUMENTS

EP      3142028 A2     3/2017
WO   2017003889 A1     1/2017

OTHER PUBLICATIONS

Extended European Search Report for EP Application No. 17194231.1 dated May 4, 2018; 10 pgs.

(Continued)

*Primary Examiner* — Dave Misir
(74) *Attorney, Agent, or Firm* — Fletcher Yoder PC

(57) ABSTRACT

Systems and methods for using a mathematical model based on historical information to automatically schedule and monitor work flows are disclosed. Prediction methods that use some variables to predict unknown or future values of other variables may assist in reducing manual intervention when addressing incident reports or other task-based work items. For example, work items that are expected to conform to a supervised model built from historical customer information. Given a collection of records in a training set, each record contains a set of attributes with one of the attributes being the class. If a model can be found for the class attribute as a function of the values of the other attributes, then previously unseen records may be assigned a class as (Continued)

accurately as possible based on the model. A test data set is used to determine model accuracy prior to allowing general use of the model.

15 Claims, 8 Drawing Sheets

Related U.S. Application Data on May 4, 2017, provisional application No. 62/502,244, filed on May 5, 2017, provisional application No. 62/502,258, filed on May 5, 2017, provisional application No. 62/502,308, filed on May 5, 2017, provisional application No. 62/502,440, filed on May 5, 2017.

(51) Int. Cl.
*G06F 40/174* (2020.01)
*G06N 5/04* (2006.01)
*H04L 29/08* (2006.01)

(58) Field of Classification Search
USPC .......................................................... 706/45
See application file for complete search history.

(56) References Cited

U.S. PATENT DOCUMENTS

| | | |
|---|---|---|
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,685,144 B1 | 3/2010 | Katragadda |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,229,800 B2 | 1/2016 | Jain et al. |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,438,212 B1* | 10/2019 | Jilani ..................... G06Q 10/20 |
| 2010/0191658 A1* | 7/2010 | Kannan .................. G06Q 30/02 705/304 |
| 2011/0029862 A1 | 2/2011 | Scott et al. |
| 2012/0130771 A1* | 5/2012 | Kannan ............ G06Q 10/06393 705/7.32 |
| 2012/0209568 A1* | 8/2012 | Arndt .................. G06F 11/3089 702/183 |
| 2014/0006861 A1* | 1/2014 | Jain ........................ G06N 5/022 714/26 |
| 2014/0081925 A1 | 3/2014 | Haeberle et al. |
| 2014/0108308 A1 | 4/2014 | Stout et al. |
| 2015/0127583 A1* | 5/2015 | Allgaier ................... G06N 5/04 706/11 |
| 2015/0142720 A1* | 5/2015 | Beechuk ................ G06N 5/048 706/50 |
| 2015/0193693 A1 | 7/2015 | Vasseur et al. |
| 2016/0217119 A1 | 7/2016 | Dakin et al. |
| 2016/0217124 A1 | 7/2016 | Sarikaya et al. |
| 2016/0350648 A1* | 12/2016 | Gilad-Bachrach .......................... G06N 3/0481 |
| 2017/0091320 A1 | 3/2017 | Psota et al. |
| 2018/0032971 A1* | 2/2018 | Karuppasamy ........ G06N 5/003 |
| 2018/0285750 A1* | 10/2018 | Purushothaman ..... G06N 5/045 |
| 2018/0285768 A1* | 10/2018 | Karuppasamy ....... G06Q 30/016 |
| 2018/0308001 A1* | 10/2018 | Doddala ................. H04L 41/16 |

OTHER PUBLICATIONS

Kadar et al., "Automatic Classification of Change Requests for Improved IT Service Quality", IEEE Xplore Digital Library, 2011 Annual SRII Global Conference, pp. 1-10, https://ieeexplore.ieee.org/document/5958118, Apr. 2, 2011.
Office Action for Canadian Patent Application No. 3,003,617, dated Apr. 8, 2020; 4 pgs.
Australian Office Action for Australian Application No. 2017236026 dated Aug. 9, 2018; 10 pgs.
Dnl Institute, Confusion matrix and Cost Matrix, published on Mar. 21, 2016 (online article), retrieved from the Internet (Wayback Machine) on Jan. 11, 2019; URL:https://web.archive.org/web/20160621220317/http://dni-institutein/blogs/confusion-matrix-and-cost-matrix/>.
Office Action for Australian Patent Application No. 2017236026 dated Jan. 14, 2019; 9 pgs.
Extended European Search Report for European Application No. 18170672.2 dated Sep. 26, 2018; 7 pgs.

\* cited by examiner

MODEL BUILDING ARCHITECTURE AND SMART ROUTING OF WORK ITEMS

CROSS REFERENCE TO RELATED APPLICATIONS

This application claims priority to U.S. Provisional Application No. 62/501,646 filed May 4, 2017, entitled "Service Platform and Use Thereof," by Lucinda Foss, et al. for all purposes, the contents of which are incorporated herein by reference in its entirety. This application also claims priority to U.S. Provisional Application No. 62/501,657 filed May 4, 2017, entitled "Service Platform and Use Thereof," by Tony Branton, et al. for all purposes, the contents of which are incorporated herein by reference in its entirety. This application also claims priority to U.S. Provisional Application No. 62/502,244 filed May 5, 2017, entitled "Service Platform and Use Thereof," by Manjeet Singh, et al. for all purposes, the contents of which are incorporated herein by reference in its entirety. This application also claims priority to U.S. Provisional Application No. 62/502,258 filed May 5, 2017, entitled "Service Platform and Use Thereof," by Sarup Paul, et al. for all purposes, the contents of which are incorporated herein by reference in its entirety. This application also claims priority to U.S. Provisional Application No. 62/502,308 filed May 5, 2017, entitled "Service Platform and Use Thereof," by Adar Margalit, et al. for all purposes, the contents of which are incorporated herein by reference in its entirety. This application also claims priority to U.S. Provisional Application No. 62/502,440 filed May 5, 2017, entitled "Machine Learning Auto Completion of Fields," by Baskar Jayaraman, et al. for all purposes, the contents of which are incorporated herein by reference in its entirety. This application is also related to non-provisional U.S. patent application Ser. No. 15/674,353 filed concurrently herewith, entitled "Machine Learning Auto Completion of Fields," by Baskar Jayaraman, et al., which is incorporated by reference for all applicable purposes in its entirety.

TECHNICAL FIELD

Embodiments described herein generally relate to cloud computing and in particular to machine learning and predictive intelligence to solve customer problems. Analysis may be performed by parsing and processing data from one or more customers and using automated techniques that leverage historical data to address current issues. The automated techniques may include smart chatbots, virtual agents, intelligent value prediction, automated process flow, self-healing based on anomaly detection, etc. Shared cloud resources may be scheduled to generate, test, and tune models.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, support personnel may be asked to deal with higher expectations of response time to infrastructure issues. The goal of most business systems, and cloud computing systems in particular, is very high availability. Accordingly, users of business systems have grown accustom to nearly 100% availability of all business functions. One important aspect of maintaining such high availability is the ability to accurately and quickly address incident reports. Incident reports may also be thought of as help desk tickets. In general, a help desk receives information from users and automated monitors about infrastructure abnormalities. For example, a help desk may receive an incident report from a customer that they cannot log into their email system, or a customer may complain that a service is down or running slowly. To address incident reports, it is important to understand what problems a customer may have and what help is needed for that customer. Further, work items associated with resolution of incident reports may require prioritization of work and making sure that assignment of work tasks are associated with proper support personnel. In general, further automation of incident report management and problem resolution may be desirable. The disclosed techniques for applying machine learning based on historical data address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
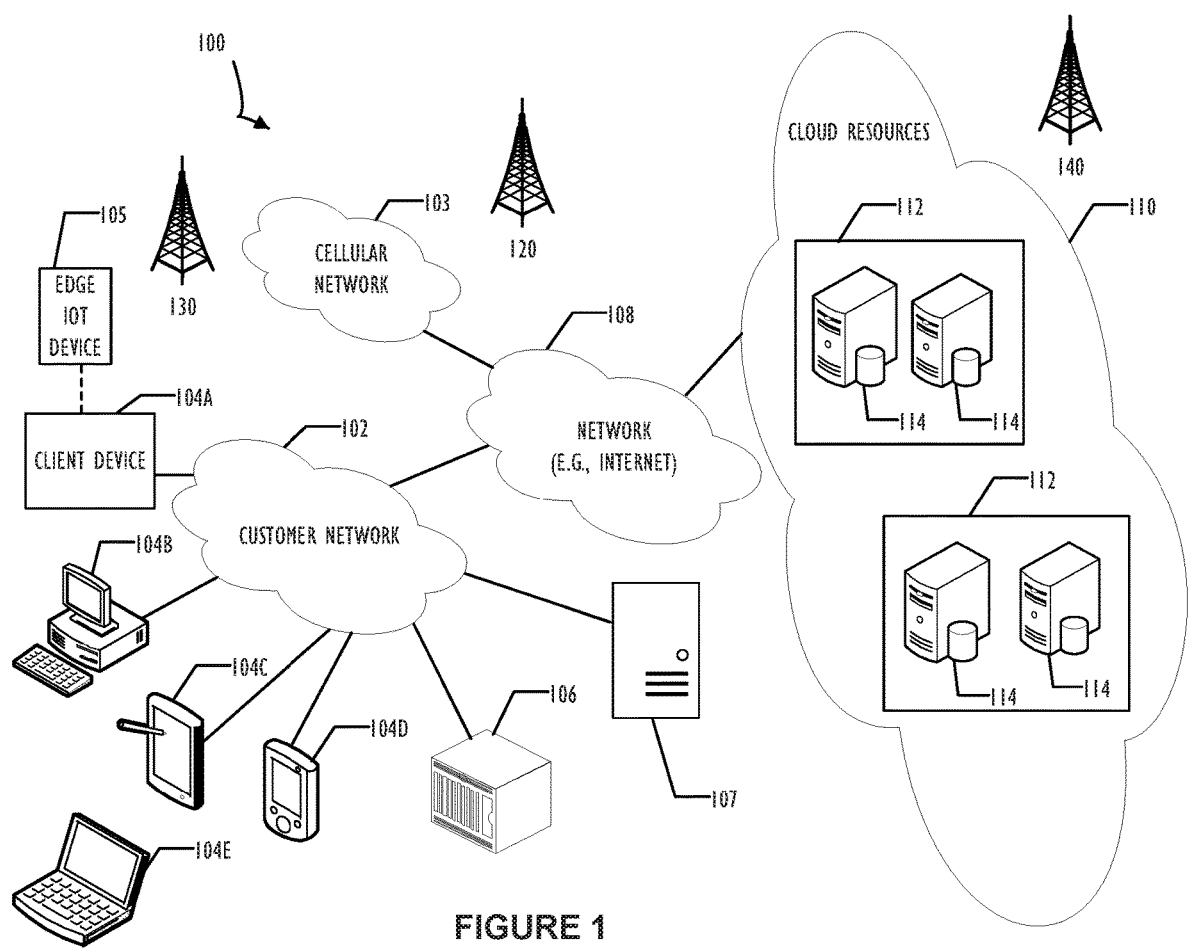
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Smart routing refers to automatically directing incident or problem reports to the correct group of people to address the issue. Utilizing disclosed predictive and automated techniques that leverage a proper model, a company may be able to reduce time and people costs by automatically categorizing, prioritizing, and assigning an incident based on previous history of similar incidents. For example, the short description field in new incident reports may be used to determine category, priority, and assignment group. This determination may be performed automatically using predictive techniques and/or automated intelligence in the form of virtual agents, chatbots, or other automated functionality that leverages a machine learning model, based on historical information, as disclosed.

To build a model, a job may be scheduled to run on the disclosed shared machine language cloud-based service. To assist in defining job parameters, pre-defined solution training templates to allow a customer to define parameters for creating a model (e.g., a solution) may be provided with pre-selected incident tables and fields that are known to produce usable models. Additionally, an administrator can choose additional fields and runtime conditions when preparing a model-building job to be scheduled. Further information about the shared machine language service is discussed below with reference to FIG. 5.

Incident reports typically have multiple attributes that may be used to facilitate processing (e.g., corrective action) of the incident report. For example, these attributes may include, but not be limited to, priority, category, classification, and assignment. Priority may be used to determine an order in which to dedicate resources for resolution. Category may be used to group incidents that are similar to each other. Classification may be used to identify a class of incident (e.g., desktop, server, mobile device, etc.). Assignment may be used to determine a work group responsible for correcting the incident. These attributes are typically set for each incident and are typically allowed to be selected from a group of pre-defined set of values. For example, the priority may be restricted (in some systems) to numerical values between 1 and 5. Prior art systems may have default values for these attributes and/or require a user selection to set an initial value. Disclosed embodiments improve on prior art systems, at least because disclosed embodiments incorporate one or more additional techniques for automatically assigning initial values or automatically "smart routing" a work item through a work flow. In one embodiment, machine learning techniques are used. For example, historical data may be collected, processed, and organized into a predictive model. The predictive model may then be used to determine an initial value for a target attribute based in part on information entered into other fields of the incident report. Routing of a work item may also be enhanced by identifying similar previous work items and "smart routing" a new work item based on information from historical and successfully completed work items. Further, each model may be different for each customer because each customer has different data sets as input to model creation. More details of using historical data and applied machine learning techniques to automatically predict values for incident report fields and smart routing are explained below with reference to FIGS. 3-4. While the examples of this disclosure are described with respect to incident reports, the disclosed techniques may be equally applicable to other types of input forms. In general, the techniques of this disclosure may be applied to any type of user-completed input form that has available underlying historical data that may be used to generate a predictive model for input selection fields of the input form (e.g., a user-completed dialog box).

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance may be configured with a client side application interface such as, for example, a web browser executing on a client device (e.g., one of client devices 104A-E of FIG. 1). In a first example, an end-user may interact with the web browser to complete a web form associated with defining an incident report. In a second example, an end-user may interact with a virtual agent or even a human agent to define an incident report. In a third example, an autonomous agent may detect a problem and generate an incident report without any human intervention. For each of these cases, the accuracy and acceptability of certain required fields in the incident report may be improved by utilizing machine learning and prediction techniques to supply proposed values rather than providing a generic default value. Of course, if the definition process is not fully automated and a user/agent is involved, the user/agent may override the predictive value. Values that are changed (e.g., overridden during lifecycle of incident report) by an end-user may be tracked and utilized to determine accuracy of the model as well as further tune and refine the predictive model. Additionally, particular users who override and exaggerate their own priority (i.e., to get quick response for minor issues that are not actually important to the business) may be identified. Because actual historical data from a particular customer may be used, accuracy of the model may be increased. Data from an actual historical incident has gone through the entire life cycle of the incident. Accordingly, information in the model may have an increased accuracy over generated training data at least because users have interacted with and presumably corrected any erroneous information when processing the actual incident report. Model drift may also be taken into account. The model is based on actual history but may need to be changed over time based on changes at the business. Accordingly, retraining the model may be automatically or periodically triggered to update the model based on real-world changes. Models may be trained in a training instance and then pushed to a customer instance for production use. Details of this will be further discussed below with reference to FIGS. 3-4.

Figure 2:
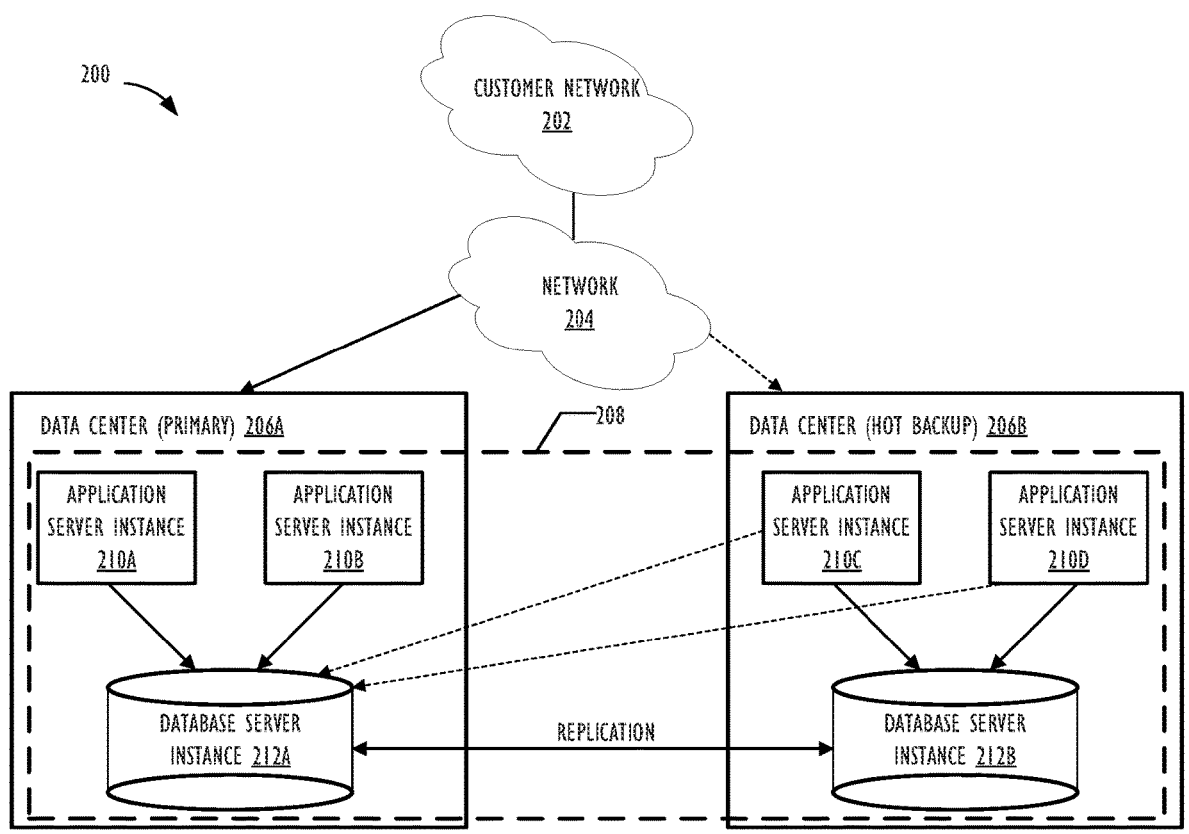
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master My SQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and MOB and/or primary data server instance 212A fails and/or is under maintenance, data traffic for customer instances 208 can be diverted to secondary application server instances 210C and 210B and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Figure 3A:
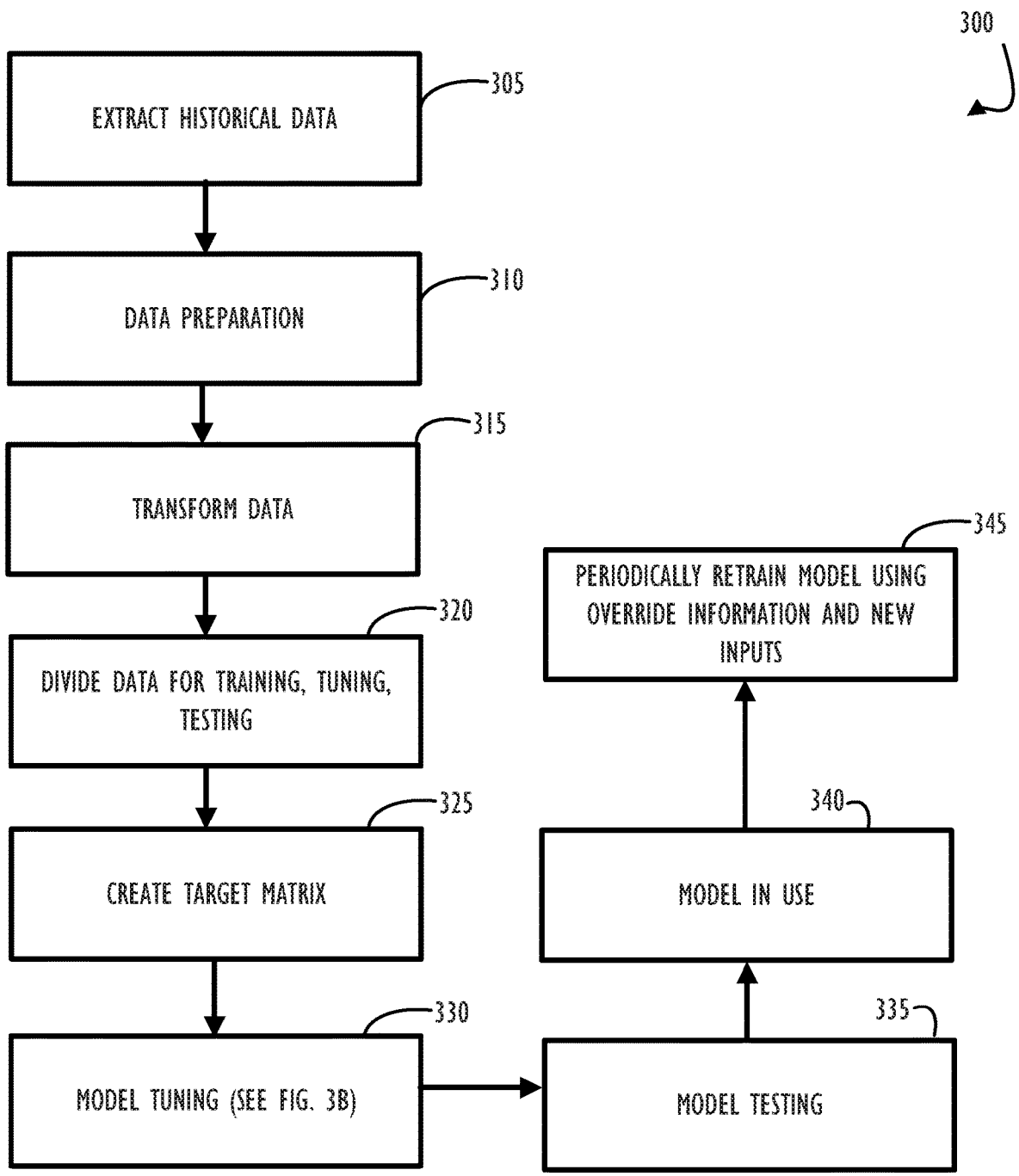
FIGS. 3A-3B illustrate flowcharts 300 and 360 respectively, outlining one possible flow for methods of creating and tuning models representative of historical input according to an embodiment of the present disclosure.

Referring now to FIG. 3A, flowchart 300 illustrates one possible flow for creating a predictive model using historical information for use in predicting incident report values according to some disclosed embodiments. For example, the process of flowchart 300 may be performed using the shared service discussed below with respect to FIG. 5. In this example, the model is formed in part by training, tuning, and testing the model using historical data for a particular customer. Historical data is used and may be selected only for previously closed incident reports that have gone through the entire incident management life cycle. Accordingly, the accuracy of the data is expected to be acceptable. Further, data from a particular customer is used in this example because a generic model may not "understand" a cultural vocabulary of an organization. That is, different business entities may, on purpose or by accident, develop a dialect that is unique to their business. For example, there may be terminology unique to their organization when referring to in-house systems and technologies.

When creating a model from customer specific historical data, the type of input data may be considered either structured or unstructured. Structured data comprises data objects that have a well-defined datatype, with a defined set of values (categorical, or numerical). Accordingly, the data objects can be thought of as points in a multi-dimensional space, where each dimension represents a distinct attribute. Such data set can be represented by an M by N matrix, where there are M rows, one for each object, and N columns, one for each attribute. Unstructured data can be transformed to structured data in order to create a mathematical model of the unstructured data. Natural language text and free-form data entry fields are examples of where unstructured data is likely to be found. Each input of unstructured data may be transformed into a vector of terms or N_grams with each term representing a component (e.g., attribute) of the vector. The cell value can be set to the number of times the corresponding term occurs in the vector or it can be a Boolean value indicating the presence or absence of the term. Stop words are words that are discarded from the input vector without further processing.

Flowchart 300 begins at block 305 where historical data may be extracted from a customer instance. As stated above, the historical data may be limited to a particular customer, a particular time period, and selected for only completed incident reports so the data may represent a high degree of accuracy. At block 310 the data preparation may be performed. Data cleansing may be performed to remove junk characters, correct spelling, and remove user preferences. Data preparation may also include functions to improve consistency of data or create composite information. In one example, there may be records that refer to "e-mail" while other records refer to "email." Changing all records to be consistent and removal of extra non-meaningful characters may increase the ability to form matches across the data. In another example, data may be deduped (removal of duplicates), joined to form new table columns, correlated as time series data, or preprocessed using other methods determined useful for the model. Block 315 indicates that data is transformed using keyword extraction and possibly other techniques. Transformation of the data generally refers to preparing a mathematical model of English sentences. A first example sentence is "I am not able to login to my computer." This would be transformed into "not able," "login," and "computer." N_gram generation may also be a part of data transformation at block 315. Single words represent a 1_gram and a pair of related words represent a 2_gram. In the above example, "not able" is a 2_gram while "login" and "computer" are 1_grams. A second example sentence is "My email is not working." This would be transformed into "email" and "not working." Taking these two sentences as examples the following matrix may be built and each record associated with a target value taken from the historical records:

TABLE 1

| Sentence | X1 email | X2 not | X3 working | X4 able | X5 login | X6 computer | Target |
|---|---|---|---|---|---|---|---|
| 1 | | X | | X | X | X | PC |
| 2 | X | X | X | | | | Email |

In this manner, keywords from natural language sentences may be used to create a model. Future incident reports including a natural language sentence in the form of a description of the problem may be parsed and used to predict a value by using the "Target" column of the matrix. Block 320 indicates that extracted historical data may be divided for the different functions associated with model creation. For example, 80% may be used for training, 10% for tuning, and 10% for testing. Block 325 indicates that a target matrix across the data may be created. One very simplified target matrix is shown in Table 1 above for two very simple example sentences. Block 330 represents that model tuning may be required. Details of model tuning are explained in more detail below with reference to FIG. 3B. Block 335 illustrates that a model may be tested to determine its accuracy, for example. Block 340 illustrates that after testing the model may be put into production use in a customer instance, for example. Block 345 illustrates that periodic retraining of the model using override information and new inputs may be required to address model drift.

Figure 3B:
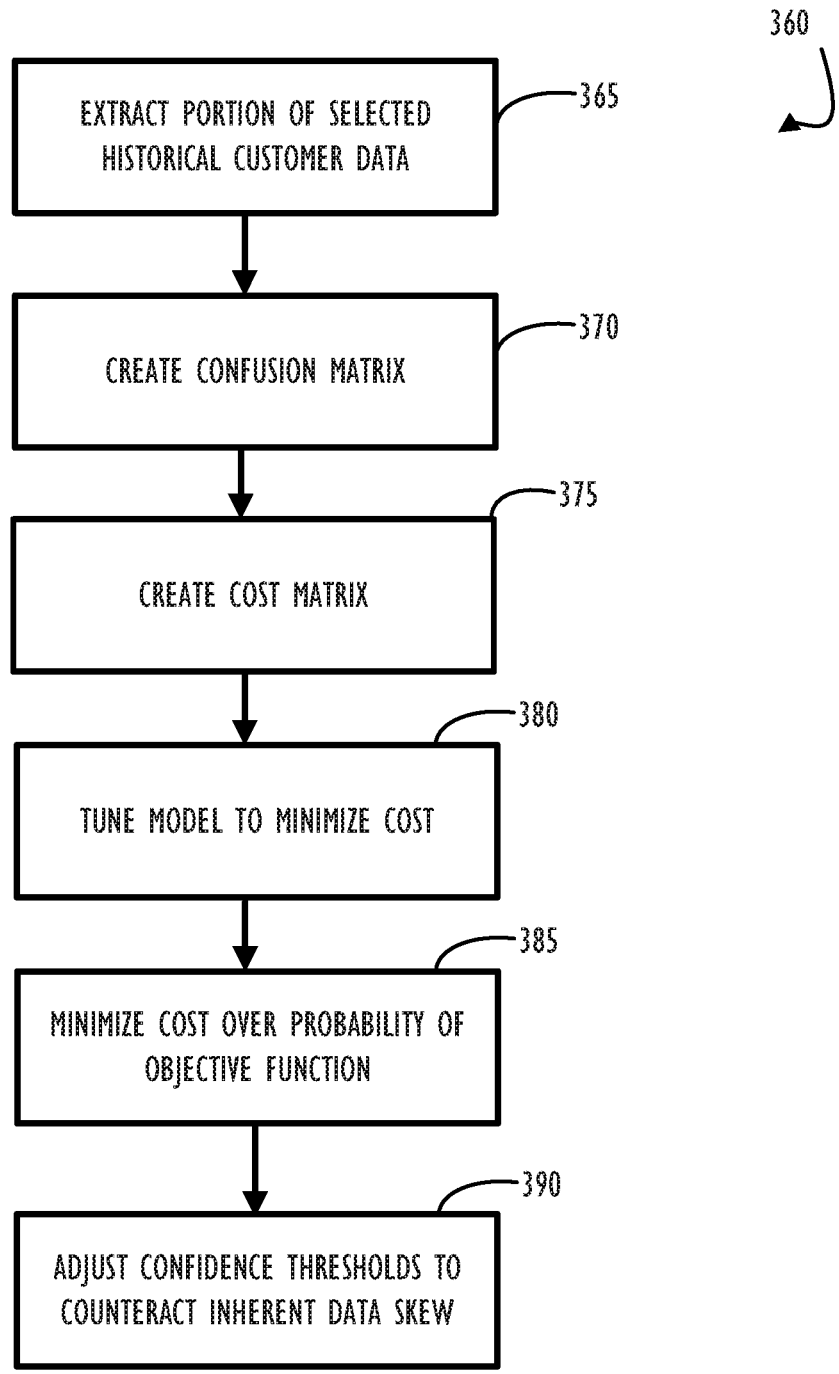

Referring now to FIG. 3B, flowchart 360 illustrates one possible method for tuning of data for a predictive model. Beginning at block 365, a portion of the extracted and cleansed data is selected for tuning. Block 370 indicates that a confusion matrix may be created. A confusion matrix monitors predicted values against actual values to assist with accuracy. An example of a very simplified confusion matrix is shown here for 1,000 records where 990 should be assigned to "EMAIL" and 10 should be assigned to "PC." The counts reflect the prediction results of the model at this phase of tuning.

|  | EMAIL | PC | Actual |
|---|---|---|---|
| EMAIL | Count = 950 | Count = 40 | 990 |
| PC | Count = 10 | Count = 0 | 10 |

This table gives us a view into the accuracy of the model. From it we can see that 40 of the actual EMAIL records were assigned incorrectly to PC and 10 of the actual PC records were assigned incorrectly to EMAIL. Block 375 indicates that a cost matrix may be created. Below is a simplified cost matrix continuing the above simplified example. We have a cost where there is an incorrect assignment and no cost (represented by 0) where the assignment was correctly made.

| EMAIL | 0 | Cost 1 |
|---|---|---|
| PC | Cost 2 | 0 |

Cost 1 represents the cost of misclassification of EMAIL to PC and Cost 2 represents the cost of misclassification of PC as EMAIL. Total cost in this example is therefore 40 Cost 1 plus 10 Cost 2. Block 380 indicates that we can tune the model to minimize cost. As illustrated at block 385 we can minimize cost over probability of the objective function. Block 390 indicates that we can adjust the confidence thresholds to counteract the data skew caused at least in part because there are so many more actual EMAIL records (i.e., 990) than actual PC records (i.e., 10). For example, we can adjust the threshold of classification to PC down to try to capture the actual 10 PC records and possibly increase the threshold of classification to EMAIL. In any case, by adjusting these thresholds and running the test again we can determine which thresholds result in the total cost being minimized. We can optimize for N−1 thresholds because the sum of all thresholds should be equal to 1. In use, we could monitor form input as it is being typed and dynamically readjust the predicted values of selectable options on any web form. Further, input may not come from an actual human end-user and may be generated by chat bots, email messages, or the like.

Figure 4:
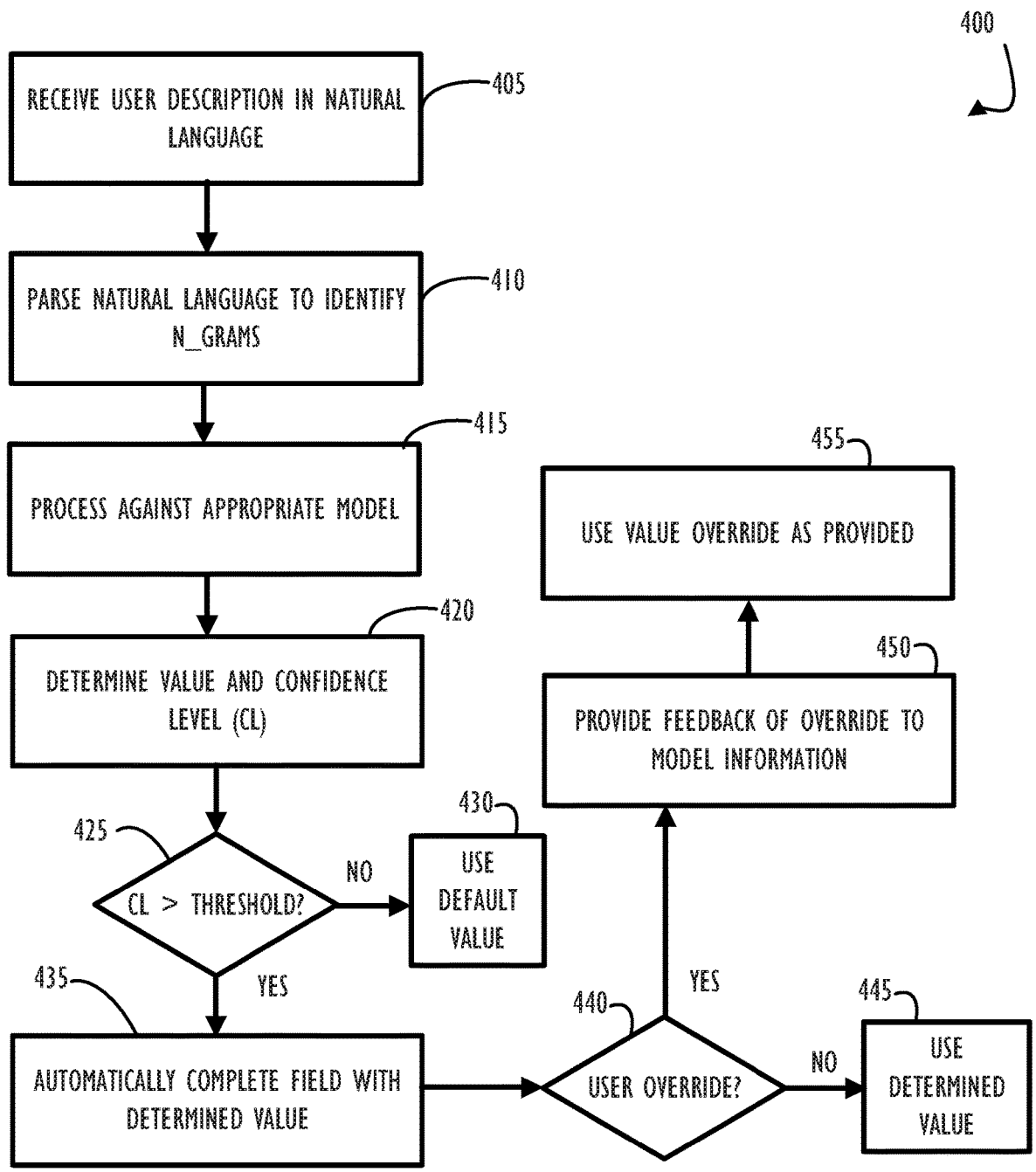
FIG. 4 illustrates a flowchart 400 representing one possible flow for performing methods of using a model to automatically assist (e.g., prediction, via virtual agent, using a chatbot) in automatically assigning priority, classification, assignment, etc. according to one or more disclosed embodiments.

Referring now to FIG. 4, flowchart 400 illustrates one possible flow for automatic completion of fields based on analysis according to one or more disclosed embodiments. Beginning at block 405 a natural language input is received. In this example a description field is used, but any field may be used without departing from the scope of this disclosure. Block 410 indicates that the natural language input may be parsed to identify N_grams as discussed above. Block 415 indicates that the parsed input may then be processed against a model to determine a value and a confidence level (block 420). Decision 425 illustrates that the confidence level may be checked against a threshold. If the value does not satisfy the threshold (NO prong of decision 425) flow continues to block 430 where a default value such as a generic default value may be used. If the value satisfies the threshold (YES prong of decision 425) flow continues to block 435 where the field may be automatically completed with the determined target value (i.e., predicted value based on model). Decision 440 determines if the user changes the predicted value. If not (NO prong of decision 440) flow continues to block 445 and the determined predicted value based on the model is used. If the user does change the value (e.g., override it), the YES prong of decision 440, flow continues to block 450 where feedback regarding the change may be used to further refine the model and prediction method. Flow continues to block 455 where the value as provide by the user is used for the incident report.

In general, model usability may be a determining factor in accuracy for predicted values. Some customers' actual historical data may not have a frequency distribution that allows for creation of a feasible model. Accordingly, it is important to consider if a model can be built based on the input data set. Given a dataset, it may be determined if a non-naïve model that is substantially better than a naïve model can be built. In one embodiment we could run a controlled experiment that produces data for hypothesis testing as explained here. First, randomly split the dataset into two parts: training and testing data. On the training data, build two models including a naïve/simple model and a non-naïve model. The naïve/simple models are ZeroR or OneR. ZeroR is the simplest classification method which relies on the target and ignores all predictors. A ZeroR classifier simply predicts the majority category (class). OneR, short for "One Rule," is a simple, yet accurate, classification algorithm that generates one rule for each predictor in the data, then selects the rule with the smallest total error as its "one rule." To create a rule for a predictor, a frequency table for each predictor against the target may be constructed. The non-naïve model is logistic regression. Next, we apply the two models to the test data. With the actual class and two predictions across the entire test data, we can create the 2 by 2 concordance-discordance confusion matrix where: $N_{00}$ represents the number of examples correctly predicted by both models, $N_{01}$ represents the number of examples correctly predicted by the naïve model but incorrectly by the non-naïve model, $N_{10}$ represents the number of examples incorrectly predicted by the naïve model but correctly predicted by the non-naïve model, and $N_{11}$ represents the number of examples incorrectly predicted by both models. Using the confusion matrix we can compute a statistical test (McNemar's test) as well as computing the signed difference in prediction errors. A large value for McNemar's test indicates that the null hypothesis (the two classifiers have the same error rate) can be rejected. A signed difference in prediction errors can confirm that the non-naïve model is more accurate. In this example, training data and testing data must remain the same for the two models. In some embodiments, this experiment on the model can be added as a new task as part of model validation or may be executed independently as part of the model creation flow.

Figure 5:
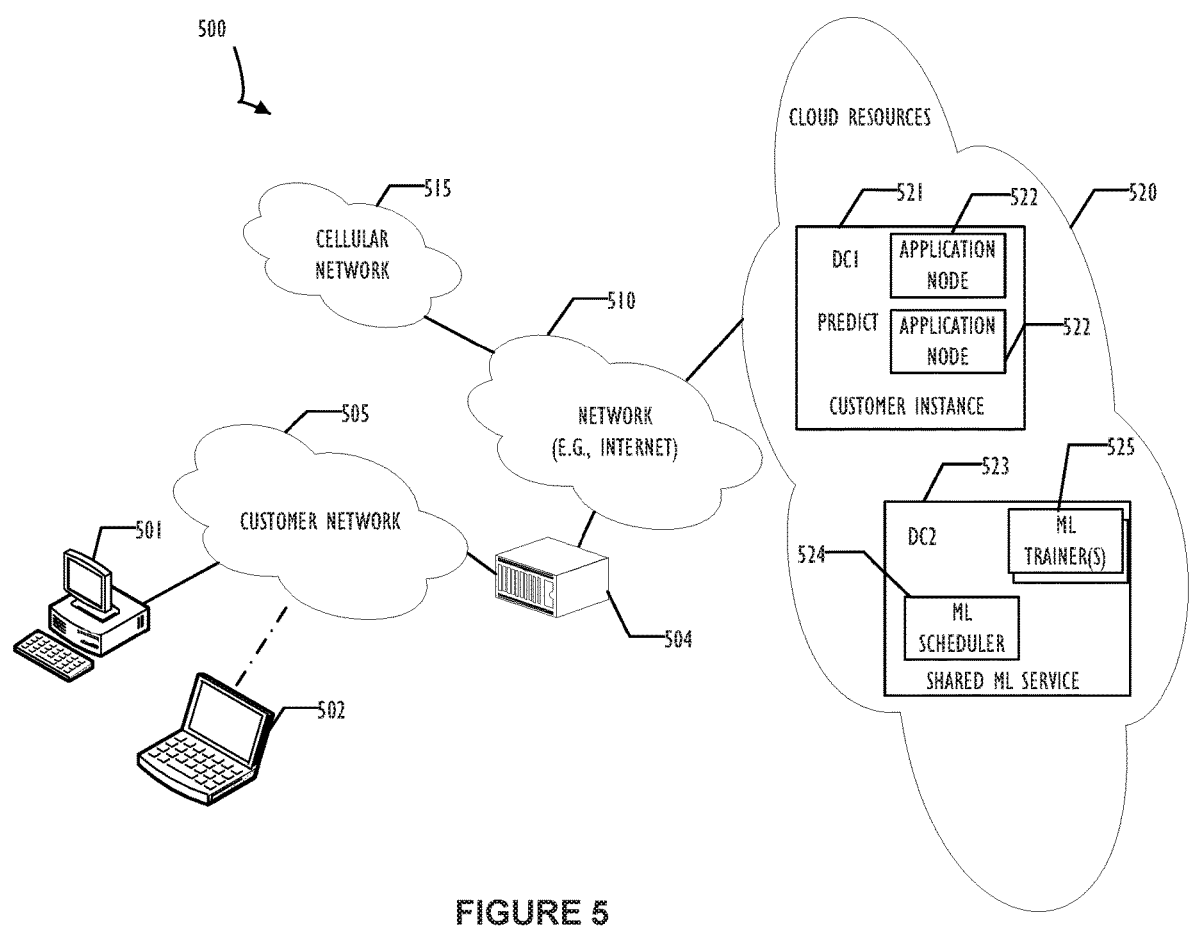
FIG. 5 illustrates a cloud-based architecture 500 including a shared machine learning service that may be shared across many cloud-based customer instances and used to create, test, train, and tune models according to one or more disclosed embodiments.

FIG. 5 illustrates an architecture 500 where a shared machine learning service may be made available using cloud resources 520 such that customer instances (e.g., 521) may request a model be built or re-trained as necessary. Architecture 500 includes three example networks that are similar to those discussed above with respect to FIG. 1. Architecture 500 includes customer network 505, connectivity network 510 (e.g., the Internet), and cellular network 515. Additional networks may provide further connectivity but are not explicitly shown. Customer network 505 is connected to external networks through firewall 504 to improve security. Customer network 505 communicates with end-users via personal computer 501 or laptop computer 502. Clearly, other end-user devices are contemplated such as smartphones or tablets communicating via customer network 505 or cellular network 515. In any case, architecture 500 supports end-users requesting a model be built using shared machine language service 523 hosted in cloud resources 520. Cloud resources 520 includes DC1, which represents a customer instance 521 that includes one or more application nodes 522. Further, customer instance 521 is configured in this example to include prediction capabilities such as the disclosed uses of a model. Cloud resources 520 further includes DC2 representing a shared machine language (ML) service 523. Shared ML service 523 includes an ML scheduler 524 and one or more ML trainers 525. These collectively represent separate training and prediction paths and instances; training instances, such as an individual ML trainer 525, may be shared across customers. However, there is no commingling of customer data and no customer data is left in training instance (e.g., ML trainer 525) after completion of a model building job. Application nodes 522 are shown to be ML model execution capable. That is, application nodes 522 are configured with prediction capability based on the disclosed techniques using models. Architecture 500 may be configured to support full instance redundancy for all production instances with near real-time replication. The ML platform illustrated in architecture 500 may be idempotent with restartable training and prediction functions. Shared ML service 523 is responsible for gathering data (e.g., from a customer instance 521) and publishing a candidate model to an application node 522 within a customer instance 521. Jobs for model creation may be submitted from customer instance 521 to shared ML service 523. When scheduling tasks via shared ML service 523, the geographic location of the data center hosting the associated customer instance 521 may be taken into account to assist in performance and availability of that trainer instance as a service for the customer instance. In one example, it may be desirable to have the trainer instance "closer" to the associated customer instance where closer can refer to geographic proximity or to a data center having a better network throughput availability. Once the model is created, it may then be published from shared ML service 523 to customer instance 521. The created model may not be able to categorize to all possible categories but should have a high accuracy rate for the percentage of categories that have the most incident reports filed against them. As a result, the user is relieved of the burden of assigning a category for a large percentage of the time and should only have to do that for the unusual categorization incidents. Also, if a new category is defined at a customer site then it will initially have very little if any prediction results, however, over time the model will likely update to understand this new category (e.g., via model drift or explicit model retraining).

In some embodiments, it may be desirable to separate the training and prediction capabilities into disparate cloud services. This may allow the cloud data center to support building models on a sub-prod instance and publish it to one or more prod instances. This separation may allow for an air-gap segregation that may enhance security and improve high availability. If a compromised training service were, for example, compromised due to human error, this embodiment would not affect run time predictions in a prod instance. High availability may be further enhanced by allowing upgrading of the training service to a latest release without causing production instance downtime.

Figure 6:
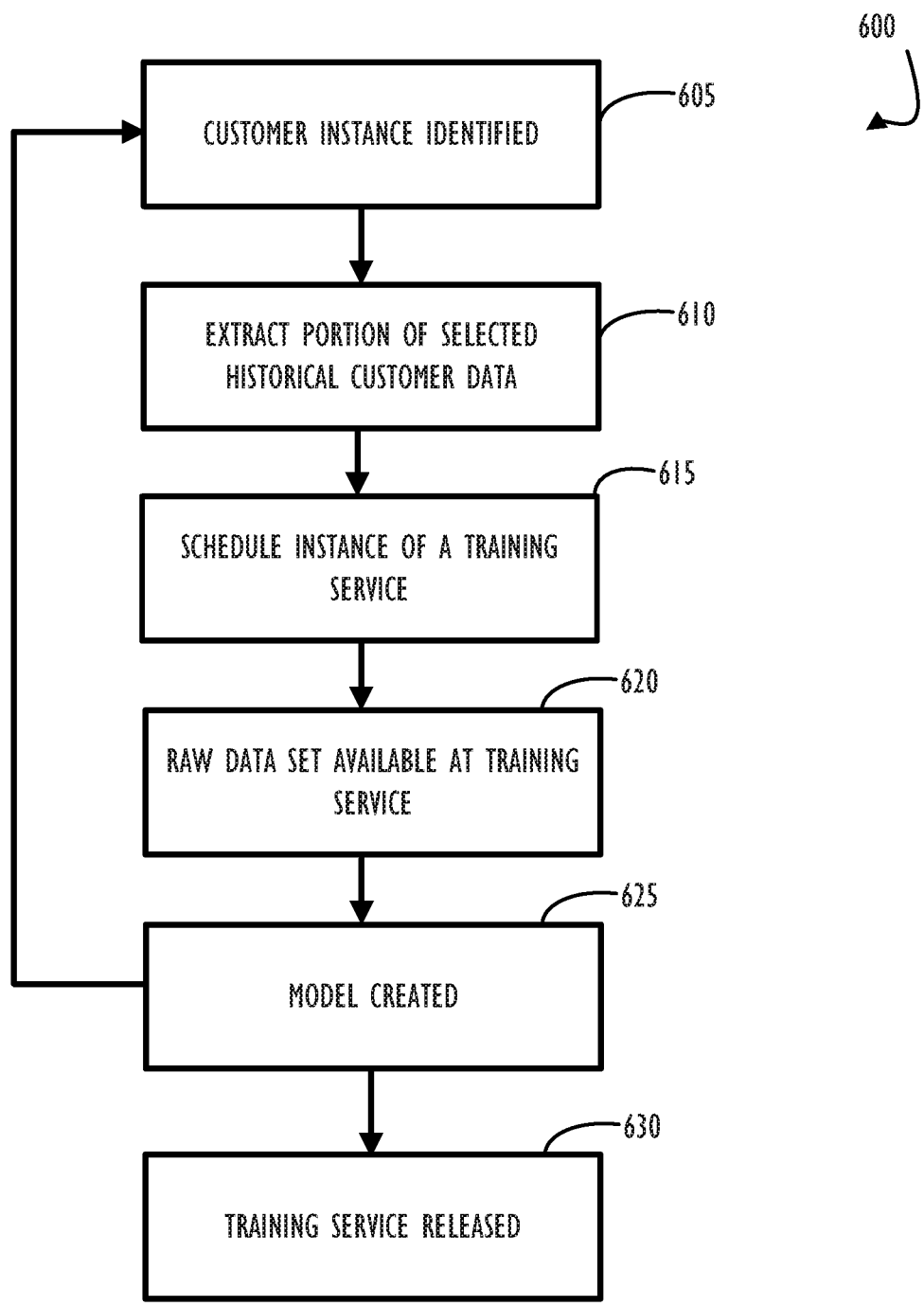
FIG. 6 illustrates a flowchart 600 representing one possible flow for scheduling creation of a model, for example using architecture 500 of FIG. 5, according to one or more disclosed embodiments.

FIG. 6 illustrates a flowchart 600 representing one possible flow for scheduling creation of a model, for example using architecture 500 of FIG. 5, according to one or more disclosed embodiments. Beginning at block 605, a customer instance made available in a cloud service provider infrastructure may be identified. The identification may take place from either an application executing within the customer instance or from an application external to the customer instance. After identification, block 610 indicates that a portion of historical data may be extracted for use in building a model. This historical data may represent completed work items (e.g., incident reports, security incidents, project tasks, etc.) and may include information about the life cycle of the completed work items. Block 615 indicates that an instance of a training service may be scheduled. For example, one of ML trainers 525 may be scheduled via ML scheduler 524 in shared ML service 523 as shown in FIG. 5. Block 620 indicates that a raw data set representing at least a portion of the extracted historical data is made available at the instance of the training service for further processing. Block 625 indicates that a model is created. For example, as discussed above with respect to FIGS. 3A, 3B, and 4. After creation the model is made available to the identified customer instance as illustrated by the return flow loop from block 625 and the instance of the training service may be released as shown by block 630. Release of an instance of a training service may include clearing all of the customer data from the instance of the training service so that it may be used for a different customer instance or releasing all resources of the instance of the training service back to the operating system or the cloud infrastructure as appropriate based on architectural considerations.

Figure 7:
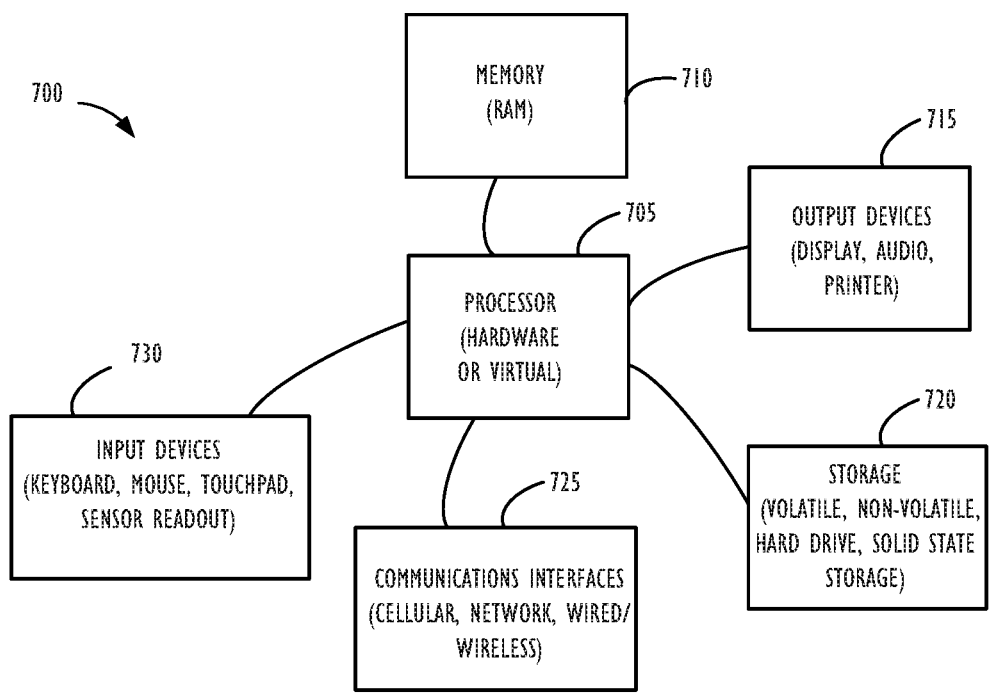
FIG. 7 illustrates a high-level block diagram 700 of a processing device (computing system) that may be used to implement one or more disclosed embodiments.

FIG. 7 illustrates a high-level block diagram 700 of a processing device (computing system) that may be used to implement one or more disclosed embodiments (e.g., service provider cloud infrastructure 110, client devices 104A-104E, server instances 112, data centers 206A-206B, etc.). For example, computing device 700, illustrated in FIG. 7, could represent a client device or a physical server device and could include either hardware or virtual processor(s) depending on the level of abstraction of the computing device. In some instances (without abstraction) computing device 700 and its elements as shown in FIG. 7 each relate to physical hardware and in some instances one, more, or all of the elements could be implemented using emulators or virtual machines as levels of abstraction. In any case, no matter how many levels of abstraction away from the physical hardware, computing device 700 at its lowest level may be implemented on physical hardware. As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display). Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 7, processing device 700 includes a processing element, such as processor 705, that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 7, the processing elements that make up processor 705 may also include one or more other types of hardware processing components, such as graphics processing units (GPUs), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random access memory (RAM), can be any suitable non-permanent storage device. The non-volatile storage devices 720 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A cloud-based computer system, comprising:
a memory partition; and
one or more network interfaces communicatively coupled to one or more processing units and to the memory partition;
wherein the memory partition comprises computer instructions that when executed by the one or more processing units cause the cloud-based computer system to provide at least one customer instance and a shared machine learning service,
wherein the at least one customer instance is communicatively coupled, via the one or more network interfaces, to a remotely executing client application and the at least one computer instance is configured to:
receive information defining one or more parameters regarding historical data pertaining to one or more completed incident reports; and
provide at least a portion of the obtained information to the shared machine learning service; and
wherein the shared machine learning service is configured to:
receive historical data from the at least one customer instance representing respective attributes of a set of resolved historical incident reports, the historical data comprising both structured and unstructured data values;
process the structured data values to create a first mathematical representation of attributes defined by the structured data;
parse the unstructured data to create generated structured data;
process the generated structured data to create a second mathematical representation of terms; and
analyze the first mathematical representation and the second mathematical representation to create a model sufficient to determine one or more attributes of a newly created incident report;
wherein the at least one computer instance is configured to apply the model to natural language text of the newly created incident report to automatically complete one or more incomplete input fields in the newly created incident report with the one or more attributes.

2. The cloud-based computer system of claim 1, wherein the shared machine learning service is configured to include a machine learning scheduler configured to receive respective requests from at least two customer instances and invoke at least two machine learning trainer instances configured to execute independently and concurrently.

3. The cloud-based computer system of claim 1, wherein each machine learning trainer instance of the at least two machine learning trainer instances purges the historical data after creation of a first model and prior to obtaining additional historical data for a second model.

4. The cloud-based computer system of claim 1, wherein the shared machine learning service is configured to retrain the model based on one or more changes to previously predicted attributes of incident reports.

5. The cloud-based computer system of claim 1, wherein the shared machine learning service is configured to:
partition the historical data to create at least a preparation dataset and a separate test dataset prior to creating the model;
create the model using the preparation dataset; and
test the model using the test dataset.

6. The cloud-based computer system of claim 1, wherein the shared machine learning service is configured to publish the model to the at least one customer instance.

7. The cloud-based computer system of claim 6, wherein the shared machine learning service is configured to schedule a machine learning trainer instance based on a geographical location associated with the at least one customer instance.

8. The cloud-based computer system of claim 1, wherein the shared machine learning service is configured to be idempotent.

9. The cloud-based computer system of claim 1, wherein the shared machine learning service is configured to provide restartable training and prediction functions.

10. The cloud-based computer system of claim 1, wherein the shared machine learning service and the at least one customer instance are configured for full instance redundancy.

11. The cloud-based computer system of claim 1, wherein the shared machine learning service is configured to provide a training feature utilizing a first portion of cloud infrastructure and a prediction feature utilizing a second portion of the cloud infrastructure, wherein the first portion and second portion maintain independence from each other.

12. A method of creating a model based on historical incident report data, the method comprising:
receiving a request, at a shared machine learning service executing in a cloud-based architecture, to schedule creation of the model for a first customer instance;
invoking a machine learning training instance associated with the shared machine learning service;
providing historical data obtained from the first customer instance to the machine learning training instance, the historical data representing respective attributes of a set of resolved historical incident reports, the historical data comprising both structured and unstructured data values;
processing the structured data values to create a first mathematical representation of attributes defined by the structured data;
parse the unstructured data to create generated structured data;
process the generated structured data to create a second mathematical representation of terms; and
analyze the first mathematical representation and the second mathematical representation to create the model sufficient to determine one or more attributes of a newly created incident report;
wherein the first customer instance is configured to apply the model to natural language text of the newly created incident report to automatically complete one or more incomplete input fields in the newly created incident report with the one or more attributes.

13. The method of claim 12, wherein the historical data comprises data obtained from the first customer instance over a defined time frame.

14. The method of claim 12, wherein parsing the unstructured data to create generated structured data comprises removing junk characters or redundant information from the unstructured data.

15. The method of claim 12, wherein parsing the unstructured data to create generated structured data comprises adjusting different references to a common item in the unstructured data to a consistent reference to the common item.

* * * * *